United States Patent
Joublin et al.

(10) Patent No.: US 7,509,177 B2
(45) Date of Patent: Mar. 24, 2009

(54) SELF-CALIBRATING ORIENTING SYSTEM FOR A MANIPULATING DEVICE

(75) Inventors: Frank Joublin, Mainhausen (DE); Tobias Rodemann, Obertshausen (DE)

(73) Assignee: Honda Research Institute Europe GmbH, Offenbach/Main (DE)

(*) Notice: Subject to any disclaimer, the term of this patent is extended or adjusted under 35 U.S.C. 154(b) by 587 days.

(21) Appl. No.: 11/101,952

(22) Filed: Apr. 8, 2005

(65) Prior Publication Data
US 2005/0234566 A1 Oct. 20, 2005

(30) Foreign Application Priority Data
Apr. 16, 2004 (EP) ................... 04009122
May 25, 2004 (EP) ................... 04012357

(51) Int. Cl.
*G05B 19/18* (2006.01)
*G06F 19/00* (2006.01)
*G05B 13/00* (2006.01)
*G05B 19/19* (2006.01)
*B25J 9/18* (2006.01)
*B25J 5/00* (2006.01)
*G05D 1/00* (2006.01)

(52) U.S. Cl. ............... 700/61; 318/568.11; 318/568.12; 318/577; 318/561; 318/587; 700/259; 700/247; 700/108; 700/109; 700/176

(58) Field of Classification Search ............ 318/568.11, 318/568.12, 587, 577, 561; 700/108, 109, 700/110, 193, 163, 176, 195
See application file for complete search history.

(56) References Cited

U.S. PATENT DOCUMENTS
4,694,229 A * 9/1987 Cormack ................... 318/561
(Continued)

OTHER PUBLICATIONS
definition for robotic: from http://en.wikipedia.org/wiki/Robotics.*
(Continued)

*Primary Examiner*—Albert DeCady
*Assistant Examiner*—Sunray R Chang
(74) *Attorney, Agent, or Firm*—Fenwick & West LLP

(57) ABSTRACT

The invention relates to the control of an orienting/positioning system comprising comprising at least a sensor and an actuator for controlling an orienting and/or positioning action adapted to change an input space of the sensor. A first step evaluates pre-action output information of the sensor in order to detect a pre-action position of a manipulating device in the input space of the sensor. A second step decides on a targeted post-action position of the manipulating device in the input space of the sensor. A third step defines a command for the actuator by mapping any deviation of the pre-action position and the targeted post-action position in the input space of the sensor to actuator control coordinates using a predefined mapping function. A fourth step orients/positions the manipulating device according to the defined command in order to carry out the orienting/positioning action. A fifth step detects a real post-action position of the manipulating device in the input space of the sensor. A sixth step adapts the mapping function used in step three based on any difference of the real post-action position and the targeted post-action position of the manipulating device in the input space of the sensor in order to carry out an incremental adaptive learning of the mapping function. According to one embodiment of the present invention, steps S1 to S6 are cyclically repeated at least once using the respectively adapted mapping function.

13 Claims, 4 Drawing Sheets

U.S. PATENT DOCUMENTS

| | | | | |
|---|---|---|---|---|
| 4,852,018 | A * | 7/1989 | Grossberg et al. | 700/259 |
| 5,083,073 | A * | 1/1992 | Kato | 318/577 |
| 5,294,873 | A | 3/1994 | Seraji et al. | |
| 6,301,396 | B1 * | 10/2001 | Michael et al. | 382/294 |
| 6,687,402 | B1 * | 2/2004 | Taycher et al. | 382/199 |
| 6,917,855 | B2 | 7/2005 | Gonzalez-Banos et al. | |
| 7,133,570 | B1 | 11/2006 | Schreier et al. | |
| 2002/0099475 | A1 | 7/2002 | Spangler et al. | |
| 2005/0234566 | A1 | 10/2005 | Joublin et al. | |

OTHER PUBLICATIONS

European Search Report, EP 05011727, Mar. 22, 2006, 7 pages.
European Search Report, EP05017386.3, Nov. 29, 2005, 7 pages.
Metta, G., "Babyrobot: A Study on Sensori-motor Development" [online], Sep. 2000, pp. 1-174, University of Geneva, Litoprint, Geneva, Italy, [retrived on Nov. 15, 2005]. Retrieved from the Internet: <URL:http://pasa.lira.dist.unige.it/Publications/thesis.pdf>.
Buessler, J. et al., "Visually Guided Movements: Learning With Modular Neural Maps In Robotics," Neural Networks, 1998, pp. 1395-1415, vol. 11.
Cimponeriu, A. et al., "Intelligent Control With The Growing Competitive Linear Local Mapping Neural Network For Robotic Hand-Eye Coordination," 1998 Second International Conference On Knowledge-Based Intelligent Electronic Systems, Apr. 21-23, 1998, pp. 46-52.
Dean, P. et al., "Saccade Control In A Simulated Robot Camera-Head System: Neural Net Architectures For Efficient Learning Of Inverse Kinematics," Biological Cybernetics, Nov. 1991, pp. 27-36, vol. 66, Springer-Verlag.
European Search Report, EP 04012356, Mar. 24, 2005, 4 pages.
European Search Report, EP 04012357, Mar. 17, 2005, 5 pages.
Kara, R. et al., "Robot Vision Tracking With A Hierarchical CMAC Controller," IEEE, 2000, pp. 271-274.
Kuhn, D. et al., "Cooperation Of Neural Networks Applied To A Robotic Hand-Eye Coordination Task," IEEE, 1995, pp. 3694-3699.
Miller III, W. T., "Real-Time Application Of Neural Networks For Sensor-Based Control Of Robots With Vision," IEEE Transactions On Systems, Man, and Cypernetics, Jul./Aug. 1989, pp. 825-831, vol. 19, No. 4.
Miller III, W. T. et al., "CMAC: An Associative Neural Network Alternative To Backpropagation," IEEE, Oct. 1990, pp. 1561-1567, vol. 78, No. 10.
Miller, W.T. et al., "UNH_CMAC Version 2.1," The University Of New Hampshire Implementation Of The Cerebellar Model Arithmetic Computer—CMAC, University Of New Hampshire, Aug. 31, 1994, pp. 1-19.
Pedreno-Molina, J. et al., "Trajectories Adaptive Prediction Based On Image Processing Cerebellar Model For Ocular-Motor Systems In Robotic Heads," IEEE, 2001, pp. 3008-3012.
Widrow, B. et al., "30 Years Of Adaptive Neural Networks: Perceptron, Madaline, And Backpropagation," Proceedings Of The IEEE, Sep. 1990, pp. 1415-1441, vol. 78, No. 9.

* cited by examiner

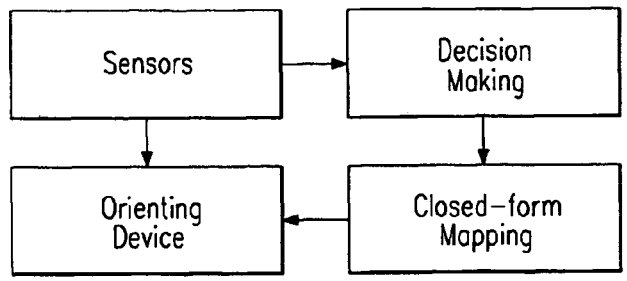
Fig. 2 [PRIOR ART]
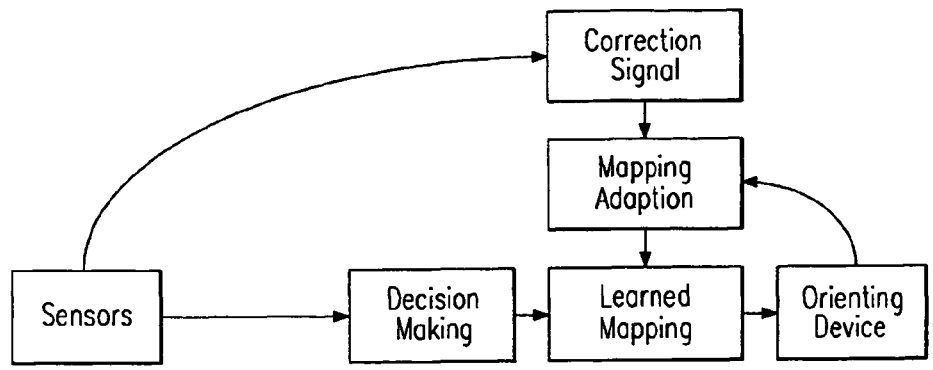
Fig. 3a
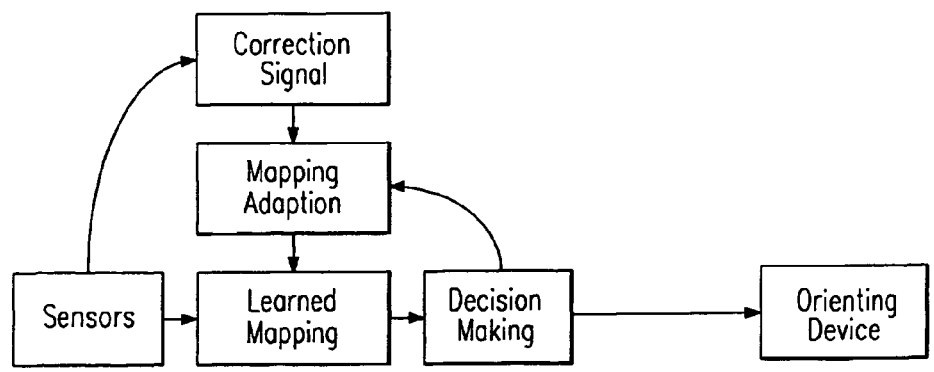
Fig. 3b

SELF-CALIBRATING ORIENTING SYSTEM FOR A MANIPULATING DEVICE

CROSS-REFERENCE TO RELATED APPLICATIONS

This application is related to and claims priority from European Patent Applications No. 04 009 122.5 filed on Apr. 16, 2004 and 04 012 357.2 filed on May 25, 2004, which are all incorporated by reference herein in their entirety. This application is related to U.S. patent application Ser. No. 11/102,283, filed on Apr. 8, 2005, entitled "Self-Calibrating Sensor Orienting System" which is incorporated by reference herein in its entirety.

FIELD OF THE INVENTION

The present invention generally relates to the field of orienting/positioning devices, and especially to control & calibration of orienting/positioning devices having sensors.

BACKGROUND OF THE INVENTION

The background of the present invention is the field of orienting/positioning devices, which shall now be explained with reference to FIGS. 1 and 2. FIG. 1 shows a stereo camera which can be directed in several degrees-of-freedom. It is now assumed that the shown camera is to be directed such that a detected visual target present somewhere in the input space of the camera moves into the origin of the input space. FIG. 2 shows a known process to calculate and carry out an action such as movement of the camera in order to achieve said object. In a first step the output of the sensor, here a camera, is evaluated to make a decision regarding a target position in the multi-dimensional input space of the sensor, which target position can e.g. be a recognized visual target. In a further step the sensor coordinates, such as angles etc., are mapped into the motor coordinates such as voltages, currents etc. . . . using a predefined look-up table or analytical function in order to generate the actuator (motor) command necessary for the before decided new orientation of the camera.

Typical examples of sensors providing explicit orientation information are an image sensor array, a radar image sensor array or a chemical receptor sensor array. A typical sensor providing implicit orientation information is the use of stereo microphones to localize a sound source. For sensors providing implicit orientation information, the orientation information is typically extracted before said orientation information can be used.

Robots comprising sensors that supply orientation information are known as orienting robots. It is a disadvantage of such orienting robots that they frequently require calibration to work properly. Such calibration must be done after every change in system geometry, for example when the physical relation between a sensor and an actuator of the robot is changed, after every modification, for example lens replacement or motor modification, and if the robot is used in a changing or uncontrolled environment.

In certain environments a manual calibration by a user is not possible or desired, for example if the robot is a probe sent to a foreign planet. Furthermore, in case of frequent changes in system geometry, frequent modification of the sensors or motors or an uncontrolled environment frequent calibration is very time consuming and laborious.

Therefore, there is a need for self-calibrating orienting robots.

Conventional self-calibrating orienting robots use techniques such as calibration scenarios, mathematical analysis or parameter/hardware tuning with human supervision. All of the above calibration techniques have disadvantages.

The use of calibration scenarios normally requires the return of actuators of the robot to reference points. Therefore, calibration in a new and/or uncontrolled environment frequently is not possible. Moreover, said calibration by using reference points frequently is not sufficient to solve the problem of non-linearity of motor responses.

Calibration by mathematical analysis has the drawback that several implicit assumptions are necessary which frequently result in strong simplifications. Often only a subset of variations is taken into account. Thus, the accuracy of said calibration method usually is insufficient. Furthermore, calibration by mathematical analysis often is not applicable for online calibration due to the high complexity.

Parameter/hardware tuning with human supervision has the drawback that it requires human expert intervention. Therefore, this calibration solution is not suitable for autonomous robots. Moreover, this calibration technique usually is very time consuming and highly depends on the experience of the expert.

Therefore, there is need for a method of controlling an orienting system and a self-calibrating orienting system that allows an auto-calibration of the system without human intervention with high accuracy.

Further, there is need for a method of controlling an orienting system and a self-calibrating orienting system which is adapted to deal with non-linearities in motor/sensor responses and which is adapted to be used changing and/or uncontrolled environment where maintenance is not possible or desired.

SUMMARY OF THE INVENTION

One embodiment of the present invention relates to the control of an orienting/positioning device having a sensor, the input space of which can be changed by a real-world action carried out by a manipulator controlled by the orienting/positioning device. According to a further embodiment of the present invention, it is envisaged to orient/position a manipulating device (module) detected by the sensor, i.e. covered by the input space of the sensor, to a predefined target position of the input space coordinates of the sensor.

One embodiment of the present invention provides a method for controlling an orienting/positioning system, the orienting/positioning system comprising at least a sensor and an actuator for controlling an orienting and/or positioning action adapted to change an input space of the sensor. According to one embodiment, the method comprises the steps of:

(S1) evaluating pre-action output information of the sensor in order to detect a pre-action position of a manipulating device in the input space of the sensor;

(S2) deciding on a targeted post-action position of the manipulating device in the input space of the sensor;

(S3) defining a command for the actuator by mapping any deviation of the pre-action position and the targeted post-action position in the input space of the sensor to actuator control coordinates using a predefined mapping function;

(S4) orienting/positioning the manipulating device by the actuator according to the defined command in order to carry out the orienting/positioning action;

(S5) detecting a real post-action position of the manipulating device in the input space of the sensor; and (S6) adapting the mapping function used in step S3 based on any difference of the real post-action position and the targeted post-action position of the manipulating device in the input space of the sensor in order to carry out an incremental adaptive learning of the mapping function, wherein steps S1 to S6 are cyclically repeated at least once using the respectively adapted mapping function.

According to one embodiment of the present invention, in step S6 a correction signal can be calculated based on any difference of the real post-action position and the targeted position of the manipulating device in the input space of the sensor. According to another embodiment, the mapping function can be adapted taking into account the correction signal and the pre-action position of the manipulating device in the input space of the sensor.

According to another embodiment, before adapting the mapping function, an adaptation vector can be multiplied with a factor larger than or equal to 0 and smaller than or equal to 1 in order to control an adaptation rate for the mapping function.

According to one embodiment, the method can further comprises the step of computing a confidence value based on a plausibility of the difference of the real post-action position and the targeted position of the manipulating device in the input space of the sensor, e.g. by means of the correlation value of selected patterns. According to a further embodiment, the adaptation vector can then be modulated with the confidence value such that the adaptation rate depends on the confidence of e.g. the correlation between selected sensor patterns before and after the action.

According to one embodiment, the mapping function can be implemented by using a look-up table that associates sensor coordinates with the corresponding actuator coordinates.

According to one embodiment, in steps S1 to S6, for each cycle, not only the position of the manipulating device, but also a neighborhood in a defined range surrounding the manipulating device is used, wherein the range of the neighborhood can be changed between two subsequent cycles. According to another embodiment, the adaptation of the mapping function can be carried out in the sensor coordinates or in the actuator coordinates.

Another embodiment of the present invention provides a method for controlling an orienting/positioning system, the orienting/positioning system comprising at least a sensor and an actuator for controlling an orienting and/or positioning action of a manipulating device able to change an input space of the sensor. According to one embodiment, the method comprises the following steps:

(S1) mapping output information of the sensor in the input space of the sensor to actuator control coordinates using a predefined mapping function;

(S2) deciding on a targeted post-action position, the decision taking place in the actuator control coordinates;

(S3) defining a command for the actuator based on a result of the decision; and (S4) orienting/positioning the manipulating device by the actuator according to the defined command.

According to one embodiment, outputs of several sensors can be individually mapped into actuator coordinates and then combined, wherein the decision in step S2 can be carried out on the basis of the result of the combination.

According to another embodiment, constraints of the actuator can be taken into account when making the decision in step S2.

A further embodiment of the present invention relates to a computer software product adapted for implementing such a method when running on a computing device or module.

A still further embodiment of the present invention relates to an auto-calibrating orienting/positioning system. According to one embodiment, the system comprises at least a sensor means, a computing means and an actuator means for controlling an orienting and/or positioning action of a manipulating device, such as a robotic device which can be detected by the sensor means and which can interact with the real-world in order to change the input space of the sensor, adapted to change an input space of the sensor means. According to one embodiment, the computing means comprises means for evaluating pre-action output information of the sensor means in order to detect a pre-action position of the manipulating device in the input space of the sensor means; means for deciding on a targeted post-action position of the manipulating device in the input space of the sensor means; means for commanding the actuator means, a command being generated by mapping any deviation of the pre-action position and the targeted post-action position in the input space of the sensor means to actuator control coordinates using a predefined mapping function; means for detecting a real post-action position of the manipulating device in the input space of the sensor means; and means for calibrating the mapping function based on any difference of the real post-action position and the targeted post-action position of the manipulating device in the input space of the sensor means in order to carry out an incremental adaptive learning of the mapping function.

DESCRIPTION OF THE DRAWINGS

FIG. 2 shows and orienting action calculating process according to the prior art.

FIG. 3a, 3b show schematically alternative processes according to various embodiments of the present invention.

DETAILED DESCRIPTION OF THE PREFERRED EMBODIMENTS

Figure 1:
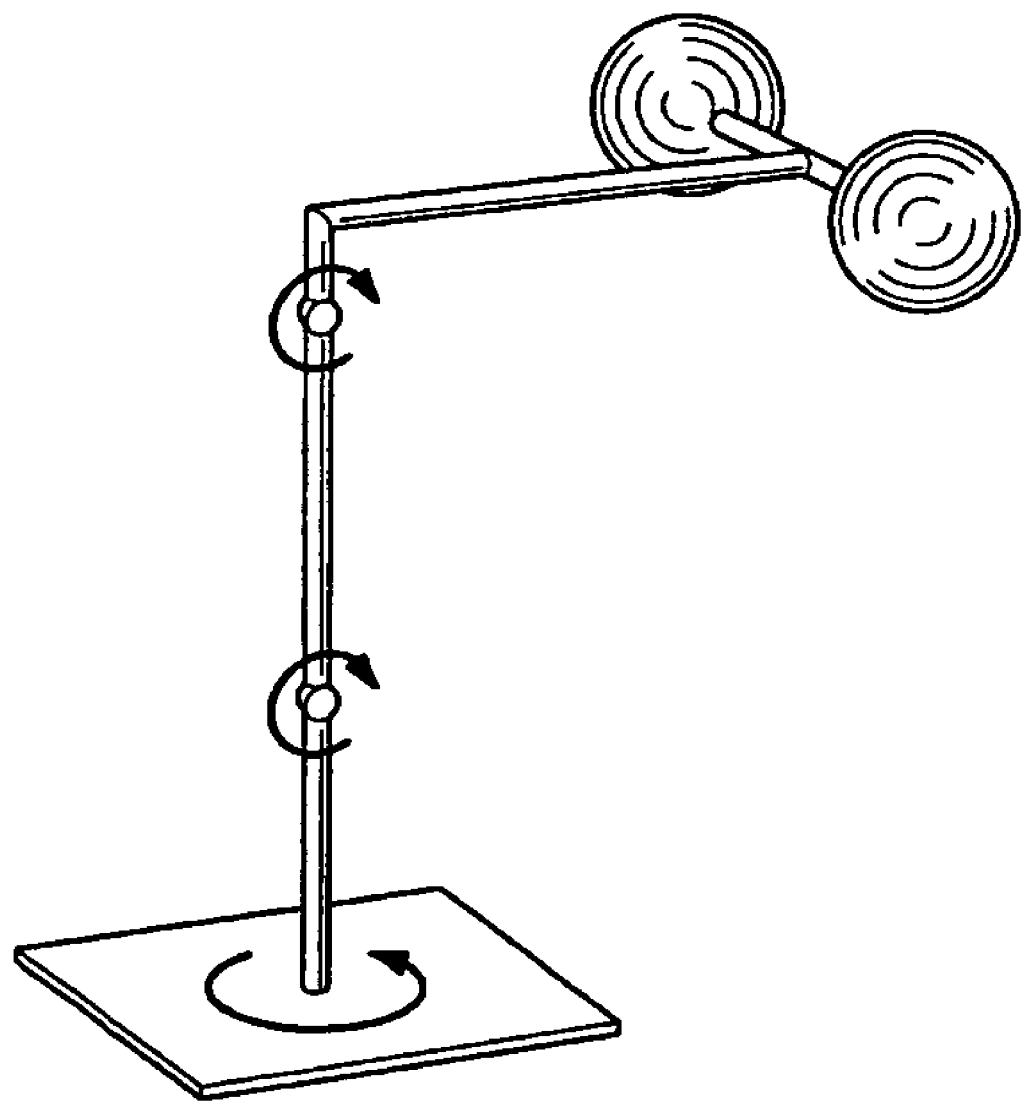
FIG. 1 shows an orienting device according to the prior art.

In the following detailed description, various embodiments of the present invention are explained by reference to the accompanying drawings, in which like reference characters refer to like parts.

A process according to one embodiment of the present invention shall now be explained with reference to FIG. 3a. According to one embodiment of the present invention, the output signal of a sensor is evaluated in order to make a decision regarding a target position of a manipulating device in the input space of a sensor, which target position is to be achieved by a pre-calculated "one-strike" action. This means that an action, i.e. a planned interaction with the real world is first set-up and then carried out in its entirety. According to this embodiment, only after the action is completed, any differences between the originally planned action and the real-world result are evaluated and additional correction actions can be planned and carried out.

For mapping the sensor coordinates of the decided action into actuator coordinates, according to one embodiment of the present invention an adaptively learned mapping is used. According to one embodiment, in a first cycle of the orientation a roughly estimated or arbitrarily set mapping function is used. According to a further embodiment, in at least one further cycle an improved "learned" mapping function is used.

This approach has the advantage that in case the sensor/actuator characteristics change because of wear, change of the set-up, replacement, temperature fluctuations, etc. . . . the correct sensor/actuator mapping will be automatically achieved via a few learning/adaptation cycles without human interference and without analytically defining the correlation between actuator and sensor coordinates.

According to one embodiment, in order to carry out the adaptive learning process, once a cycle is completed and an action is carried out, the success of the action, i.e. whether the manipulating device has actually been brought close to the target position, is evaluated and depending on any deviation a correction signal is generated and fed to the mapping unit in order to carry out an incremental learning step. According to a further embodiment of the present invention, this cycle can be repeated until the deviation between the planned action and the real-world result is smaller than a preset threshold value. According to a still further embodiment, the cycles can be repeated continuously.

According to one embodiment, the correction signal is generated after the action, which was meant to bring upon the desired result in one strike, has been completed.

To summarize, according to various embodiments, the action to be taken is decided in the sensor coordinates; and the decision making result is then mapped to the actuator (motor) coordinates.

FIG. 3b shows another embodiment of the present invention in which the sensor coordinates are first mapped to the actuator coordinates before carrying out the decision making process in the actuator coordinate system. This arrangement has the advantage that exemplary restrictions on the actuator coordinates such as maximum ranges, speed, acceleration, etc. . . . can be easier taken into account during the decision now taking place in the actuator coordinates.

Further on, according to various embodiments shown in FIG. 3b output signals of different, eventually heterogeneous sensors can be individually mapped into respective actuator coordinates which can then be easily combined in order to make the decision on the action to be taken on the basis on the combined actuator coordinates.

Figure 4:
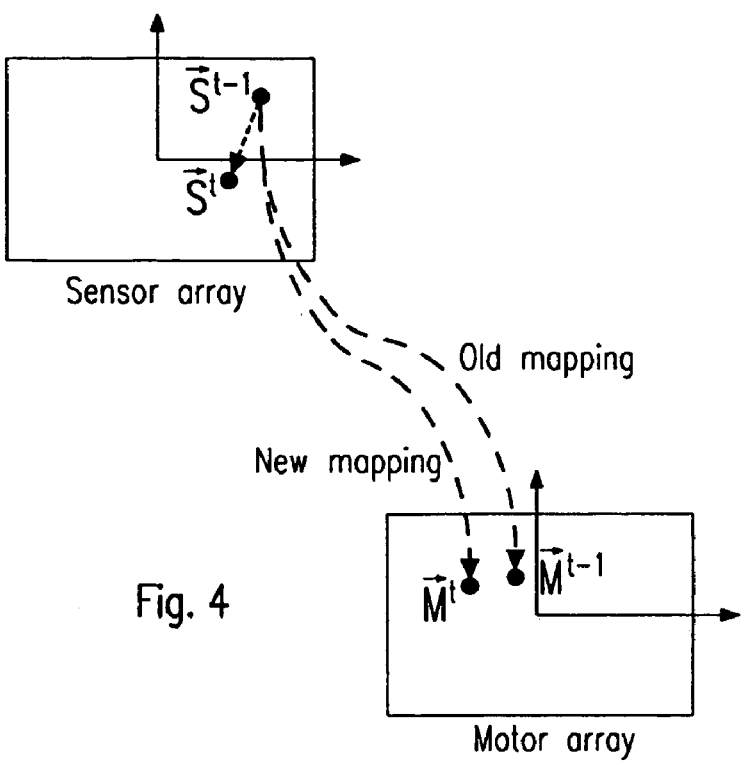
FIG. 4 shows calculation of the correction signal for an adaptive learning of the mapping function according to one embodiment of the present invention.

With reference to FIG. 4 one embodiment of the calculation of a correction signal and the adaptation of the mapping function shall be explained. As already explained, according to one embodiment, it is the aim of the mapping to translate the coordinates of the action decided in sensor coordinates to coordinates adapted for the control of the actuator. Accordingly, FIG. 4 shows both a diagram of an exemplary sensor array and an exemplary motor array, respectively. According to one embodiment, it is envisaged to carry out an action by which the pre-action location $\vec{S}_x^{t-1}$ is transferred to the centre of the sensor array or sensor input space. According to a further embodiment using a pre-set mapping function it is assumed that the corresponding actuator (motor) command is $\vec{M}_x^{t-1}$. Using this motor command, however, the pre-action location $\vec{S}_x^{t-1}$ is not exactly transferred to the target position in the sensor array, but to the post-action location $\vec{S}_x^t$.

According to a further embodiment, now the incremental learning adaptation of the mapping function is carried out as an linear extrapolation, i.e. the adaptively corrected motor command for the coordinate (degree-of-freedom) x and to be used for the next cycle is derived as shown in equation (1) below.

$$\vec{M}_x^{t+1} = \vec{M}_x^{t-1} + a_x \left( \hat{\vec{M}}_x^t - \vec{M}_x^{t-1} \right) \quad (1)$$

In equation (1), $$\hat{\vec{M}}_x^t = \vec{M}_x^{t-1} \cdot \frac{\vec{S}_x^{t-1}}{\left( \vec{S}_x^{t-1} - \vec{S}_x^t \right)},$$

and $a_x$ is an optional parameter which controls the adaptation rate of the coordinate x. According to one embodiment, the value of $a_x$ is larger than or equal to zero and smaller than or equal to one.

According to one embodiment, note that this extrapolation-type learning process can also be used for non-linear mappings.

According to further embodiments, the learning process as shown in FIG. 4 can be applied both to the decision making strategies of FIG. 3a and FIG. 3b.

According to various embodiments, this learning process can also be used in case of a single as well as multiple stimulus-emitting sources in the input space of the sensor(s).

Figure 5:
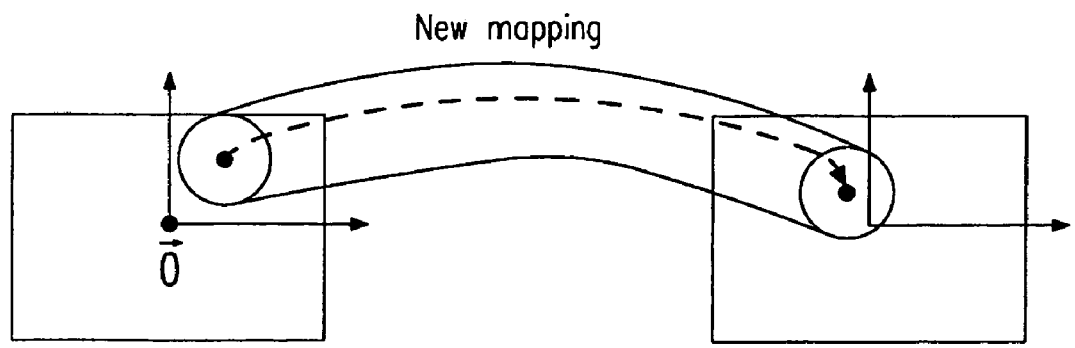
FIG. 5 shows an option for accelerating the adaptation process according to one embodiment of the present invention.

According to one embodiment, in order to accelerate the learning process (potentially slowed down by the adaptation rate parameter $a_x$) more than one location can be used in each cycle. According to a further embodiment shown in FIG. 5, to speed-up the convergence of the adaptation, a defined neighborhood of a location can be used. By making the range of the neighborhood variable in time, it is possible to achieve a mapping function that remains plastic for the case of sudden de-calibration of the system and at the same time locally stable to guarantee an accurate representation of any non-linearities.

Figure 6:
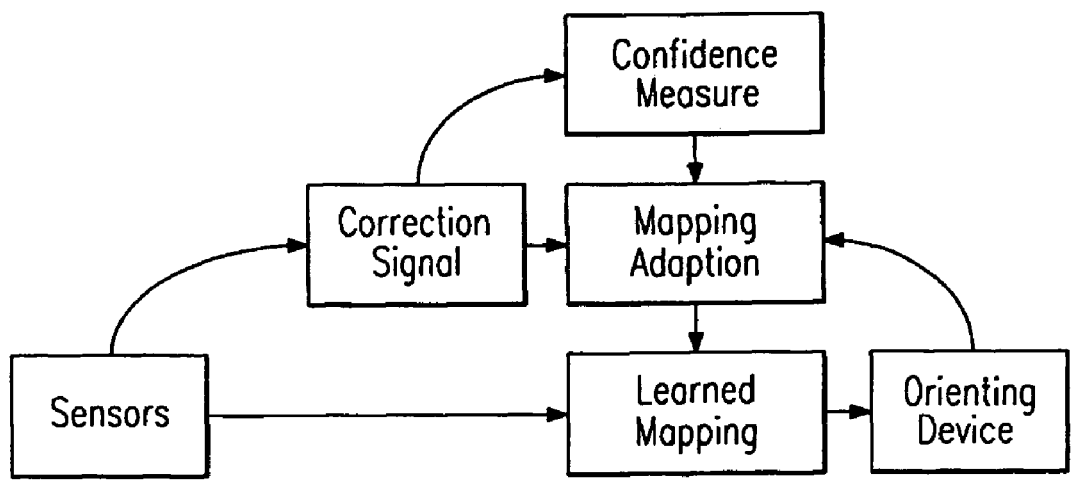
FIG. 6 illustrates the introduction of confidence values in the learning process of FIG. 3a or 3b according to various embodiments of the present invention.

FIG. 6 shows schematically that a confidence measure can be derived from the correction signal according to one embodiment of the present invention, e.g. applying plausibility checks. The adaptation rate can then be modulated with the confidence measure, preferably having a value between 0 and 1. The introduction of the confidence measure minimizes the occurrence of erroneous adaptation steps, which can take place in case of incorrect estimations of the correction signal. According to one embodiment, the correction signal is usually computed by a correlation method, in which case the correlation can be used, after normalization, as a confidence measure.

Figure 7:
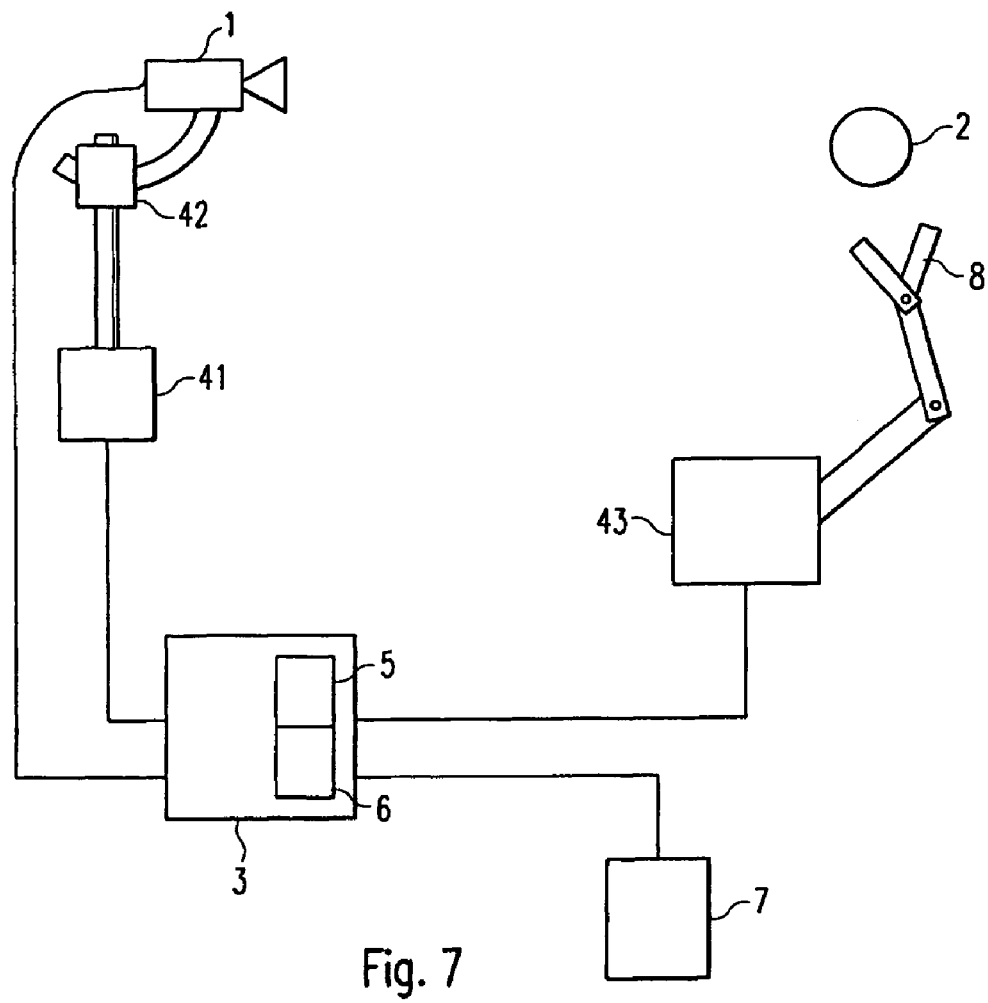
FIG. 7 shows a block diagram of a self-calibrating orienting/positioning system according to one embodiment of the present invention

FIG. 7 schematically shows a self-calibrating orienting/positioning system according to one embodiment of the present invention. The system comprises a sensor 1 for gathering information of the real world in order to localize a manipulating device in the at least one-dimensional input space of sensor 1. According to various embodiments, the sensor 1 may be a radar image sensor array, a chemical receptor sensor array or a stereo microphone for localizing a sound emitted by the object 2 or any other directional sensor.

According to one embodiment, sensor 1 is mounted on a frame comprising one or more actuators such as 41 and 42 which are for example adapted to tilt and pan the sensor 1. For example, said actuators 41 and 42 can be electrical linear motors.

According to one embodiment, actuators 41 and 42 are adapted to change the input space of the sensor 1 by moving the sensor 1 itself. Note that any planned process adapted to change the input space of sensor 1 by a manipulation in the real world is called an "action" within the framework of the present specification. According to one embodiment, "pre-action" and "post-action", respectively, designates states before and after such an action controlled by the actuators has taken place.

According to one embodiment, the sensor 1 and the actuators 41 and 42 are connected to a computing module 3.

In FIG. 7 said computing module 3 is a computer which, according to one embodiment, is adapted to define a targeted post-action position information of the manipulating device in the input space of the sensor 1 and to calculate a command for actuators 41 and 42 to move the sensor 1. According to further embodiments, the computing module 3 can be adapted to calculate a command to move a manipulator 8 of a robot or manipulator 43, the movement of the manipulator 8 also being an action suited to change the input space of sensor 1 under the control of the actuators 41 and 42.

According to one embodiment, when calculating the command for the respective actuators 41 and 42 or the robot 43, the computing module 3 uses pre-action position information provided by said sensor 1, i.e. information on the position of the manipulating device in the input space of the sensor 1 before the action has taken place, and targeted post-action position information, i.e. information representing a target position of the manipulating device 2 after the action has taken place. According to one embodiment, the target position can be, for example, the centre of the input space of the sensor 1. According to another embodiment, such as in case the actuators control e.g. the manipulator arm of a robot etc., the target position can be set as the position (still in the input space of the sensor 1) of an object to be manipulated by the robot.

According to one embodiment, computing module 3 comprises a determining module 5 and a comparing module 6. According to another embodiment, determining module 5 is adapted to determine whether post-action position information output by the sensor 1, after an action of said actuators 41, 42 and/or said robot 43 with said object 2 and/or said manipulator 8 by moving said sensor 1 or by moving said manipulator 8 is completed, coincides with the targeted post-action position as defined before by the computing module 3.

According to one embodiment, if the determining module 5 determines that the post-action object-sensor position information does not match the targeted object-sensor position information, the computing module 3 is further adapted to correct the calculated command for the actuators 41, 42 and the manipulator 43, respectively by using the comparison result output by comparing module 6. The corrected command can then be used for a future action.

According to one embodiment, in order to implement the learning strategy shown in FIG. 3a, computing module 3 is adapted to calculate a difference between post-action object-sensor position information and targeted post-action object-sensor position information and to automatically correct the calculate command for actuators 41, 42 or manipulator 43 by using equation (2) below.

$$\vec{M}_x^{t+1} = \vec{M}_x^{t-1} + a_x \left( \hat{\vec{M}}_x^t - \vec{M}_x^{t-1} \right) \qquad (2)$$

According to one embodiment, in equation (2), $$\hat{\vec{M}}_x^t = \vec{M}_x^{t-1} \cdot \frac{\vec{S}_x^{t-1}}{\left( \vec{S}_x^{t-1} - \vec{S}_x^t \right)},$$

$\vec{M}_x^{t+1}$ is the corrected command for the actuators 41, 42, or manipulator 43 for the dimension x at the time t+1, $\vec{M}_x^{t-1}$ is the uncorrected command for the actuators 41, 42, or manipulator 43 for the dimension x at the time t−1, $\vec{S}_x^t$ is the post-action object-sensor position information for the dimension x at time t after said actuators 41, 42, or manipulator 43 has been controlled according to the uncorrected command, $\vec{S}_x^{t-1}$ is the targeted post-action object-sensor position information for the dimension x at time t−1, and $a_x$ is a constant which controls the rate of adaptation for the dimension x.

The usage of said difference allows a correction of the calculated command for the actuators 41, 42 and/or the manipulator 43 in a very accurate way since the amount of accuracy presently achieved by the command previously used to control the actuators 41, 42 and/or the robot 43 explicitly is considered.

According to one embodiment, the corrected commands, i.e. the adaptively learned mapping function, can be stored by computing module 3 in a storing module 7 in said command-map.

According to a further embodiment, the commands stored in the command map are used by the computing module 3 to calculate any new commands for the actuators 41, 42 and the manipulator 43, respectively.

By automatically comparing a post-action output of the sensor 1 with a pre-action output of the sensor 1 and using said comparison result to correct the calculated command for the actuators, one embodiment of the present invention allows an auto-calibration of the orienting system and an adaptation to changing and uncontrolled environments.

Therefore, various embodiments of the present invention provide a method of controlling an orienting system and a self-calibrating orienting system, which allows automatic calibration of the system without human intervention with high accuracy. Furthermore, various embodiments of the method of controlling orienting system and the inventive self-calibrating orienting system are adapted to deal with non-linearities in motor/sensor responses and are suitable to be used in a changing and/or uncontrolled environments where maintenance is not possible or desired. Thus, a long-time operation of the system and method of the present invention without human interference is possible.

One embodiment of the present invention is simpler, more flexible and requires less maintenance than self-orienting/self-calibrating systems of the prior art. According to a further embodiment, a change in the geometry of a system is possible without necessitating a new calibration of the actuator/s and the sensor.

The present invention may be embodied in various forms and should not be construed as limited to the embodiments set forth herein. Rather, these embodiments are provided so that disclosure will be thorough and complete and will fully convey the invention to those skilled in the art. Further, the apparatus and methods described are not limited to rigid bodies. While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for controlling an orienting/positioning system, the orienting/positioning system comprising at least a sensor and an actuator for controlling at least one of an orienting action and a positioning action adapted to change an input space of the sensor, the method comprising the steps of:
   (S1) evaluating pre-action output information of the sensor in order to detect a pre-action position of a manipulating device in the input space of the sensor;
   (S2) determining a targeted post-action position of the manipulating device in the input space of the sensor;
   (S3) defining a command for the actuator by mapping any deviation of the pre-action position and the targeted post-action position in the input space of the sensor to actuator control coordinates using a predefined mapping function;
   (S4) orienting the manipulating device by the actuator according to the defined command in order to carry out the orienting action;
   (S5) detecting a real post-action position of the manipulating device in the input space of the sensor; and
   (S6) adapting the mapping function used in step S3 based on any difference of the real post-action position and the targeted post-action position of the manipulating device in the input space of the sensor in order to carry out an incremental adaptive learning of the mapping function, said adapting comprising the steps of:
      determining a correction signal based on any difference of the real post-action position and the targeted position of the manipulating device in the input space of the sensor,
      adapting the mapping function taking into account the correction signal, the executed actuator command and the pre-action position of the manipulating device in the input space of the sensor,
      determining a confidence value based on a plausibility of the difference of the real post-action position and the targeted position of the manipulating device, and
      modulating an adaptation vector with the confidence value such that an adaptation rate depends on the confidence value;
   wherein steps S1 to S6 are cyclically repeated at least once using the respectively adapted mapping function.

2. The method of claim 1, wherein before adapting the mapping function, an adaptation vector is multiplied with a factor larger than or equal to 0 and smaller than or equal to 1 in order to control an adaptation rate for the mapping function.

3. The method of claim 1, wherein the mapping function is implemented by means of a look-up table.

4. The method of claim 1, wherein in steps S1 to S6, for each cycle, not only the position of the manipulating device, but also a neighborhood in a defined range surrounding the manipulating device is used.

5. The method of claim 4, wherein the range of the neighborhood can be changed between two subsequent cycles.

6. The method of claim 1, wherein the adaptation of the mapping function is carried out in the sensor coordinates.

7. The method of claim 1, wherein the adaptation of the mapping function is carried out in the actuator coordinates.

8. A computer software product adapted for implementing the method of claim 1 when running on a computing device.

9. An auto-calibrating orienting/positioning system, comprising at least a sensor means, a computing means and an actuator means for controlling at least one of an orienting and a positioning action of a manipulating device adapted to change an input space of the sensor means, the computing means comprising:
   means for evaluating pre-action output information of the sensor means in order to detect a pre-action position of the manipulating device in the input space of the sensor means;
   means for deciding on a targeted post-action position of the manipulating device in the input space of the sensor means;
   means for commanding the actuator means, a command being generated by mapping any deviation of the pre-action position and the targeted post-action position in the input space of the sensor means to actuator control coordinates using a predefined mapping function;
   means for detecting a real post-action position of the manipulating device in the input space of the sensor means; and
   means for calibrating the mapping function based on any difference of the real post-action position and the targeted post-action position of the manipulating device in the input space of the sensor means in order to carry out an incremental adaptive learning of the mapping function, said means for calibrating comprising:
      means for determining a correction signal based on any difference of the real post-action position and the targeted position of the manipulating device in the input space of the sensor, wherein the mapping function is calibrated taking into account the correction signal and the pre-action position of the manipulating device in the input space of the sensor means,
      means for adapting the mapping function taking into account the correction signal, the executed actuator command and the pre-action position of the manipulating device in the input space of the sensor,
      means for determining a confidence value based on a plausibility of the difference of the real post-action position and the targeted position of the manipulating device, and
      means for modulating an adaptation vector with the confidence value such that an adaptation rate depends on the confidence value.

10. The system of claim 9, wherein before the calibration of the mapping function, the correction signal is multiplied with a factor larger than or equal to 0 and smaller than or equal to 1 in order to control an adaptation rate for the mapping function.

11. The system of claim 9, wherein the mapping function is implemented by means of a look-up table.

12. The system of claim 9, wherein the sensor means comprise at least one of a camera or a microphone.

13. The system of claim 9, wherein the manipulating device comprises a robotic device.

* * * * *